United States Patent [19]
Glucksman
[11] E Patent Number: Re. 32,349
[45] Reissued Date of Patent: Feb. 10, 1987

[54] HAIR ROLLER

[76] Inventor: Dov Z. Glucksman, 193 St. Botolph St., Boston, Mass. 02115

[21] Appl. No.: 610,840

[22] Filed: May 16, 1984

Related U.S. Patent Documents

Reissue of:
[64] Patent No.: 5,101,983
Appl. No.: 254,869
Filed: Apr. 16, 1981

[51] Int. Cl.[4] ..... A45D 2/17
[52] U.S. Cl. ..... 132/33 R
[58] Field of Search ..... 132/33, 40

[56] References Cited

U.S. PATENT DOCUMENTS

| | | | |
|---|---|---|---|
| 3,260,267 | 7/1966 | Rubenstein et al. | 132/40 |
| 3,291,142 | 12/1966 | Green et al. | 132/40 |
| 3,600,552 | 8/1971 | Tolmie | 132/33 R |
| 3,766,930 | 10/1973 | Madsen | 132/33 R |
| 4,056,109 | 11/1977 | Takai | 132/40 |

*Primary Examiner*—Gregory E. McNeil
*Attorney, Agent, or Firm*—John S. Roberts, Jr.

[57] ABSTRACT

A hair roller adapted to be heated by being positioned on a hot post of a hair setting unit, consists of a plastic, cylindrical and hollow outer body, provided with outstanding teeth on its outside surface. It is closed at its upper end and open at its lower end, its hollow portion being cylindrical in its upper part, extending to about two thirds of its length, and the remaining lower third is tapered towards the lower opening. A tubular insert, made of a resilient aluminum alloy, extends the length of the hollow portion. It is longitudinally slit over its entire length, and the two edges of the slit extend to both sides of an inwardly projecting longitudinal ridge provided in the cylindrical part of the hollow portion. The insert is provided with an outwardly projecting lug on one edge of the slit, which engages with a perforation or a recess in the outer body. The insert is slotted by parallel slots extending from its lower end as far as the tapered hollow portion, a feature permitting positioning of the roller on a frusto-conical, heated post of a hair setter unit in metal-to-metal contact over the entire slotted portion.

9 Claims, 4 Drawing Figures

HAIR ROLLER

Matter enclosed in heavy brackets [ ] appears in the original patent but forms no part of this reissue specification; matter printed in italics indicates the additions made by reissue.

BACKGROUND OF THE INVENTION

The invention relates to a hair roller used for setting hair into a predetermined pattern of curls and waves, by winding strands of hair around the heated cylindrical body. These rollers are heated by being placed on heated metal posts forming part of an electric hair setter unit, which is usually in the form of a metal plate carrying from 5 to 30 posts, each post heating one curler. Upon the rollers reaching the suitable temperature, they are taken off the posts, one by one, and placed into the correct position in a woman's head hair.

The existing rollers comprise a cylindrical hollow body of a thermo-plastic material, provided on its outer surface with a plurality of radial teeth and, optionally, with co-axial rings at one or both ends. The cylindrical hollow portion of the plastics body is provided with a tubular insert which is generally pressed into the body and which is adapted to transfer heat from the heated metal post on which it is placed, to the outer surface of the roller, and to the hair wound around it.

The metal posts of the existing hair setter units are either cylindrical or frusto-conical, and it will be readily understood that the contact area between metal insert and post is only along a line or a narrow strip; in the case of a conical post, contact is along the circular lower edge of the tubular insert, and in the case of a cylindrical post, contact is along a straight longitudinal line on the cylinder surface. Only this small contact area serves to transfer heat by conduction, and most of the heat is, therefore transmitted by convection through interposed air, resulting in rather slow heat transfer. Another drawback of the existing rollers is the frequent loosening of the insert caused by different coefficients of expansion of the metal and the plastics, further reducing heat transfer between these components. A further drawback of the cylindrical insert is frequent wedging or jamming of the roller, but on a cylindrical and a frusto-conical post.

With a view to obviate these drawbacks, it is a primary object of the present invention to provide a hair roller wherein a tubular metal insert is elastically pressed against the inner walls of the plastics curler body. A second object is to provide intimate contact between frusto-conical or conical posts and the insert over a large portion of the entire insert surface. Still another object is to prevent the rollers from wedging on the posts and hindering their ready removal therefrom.

SUMMARY OF THE INVENTION

The hair roller, according to the invention, consists of a cylindrical body of a thermo-plastic material, provided with external hair gripping means as known to the art, the body having a closed upper end and an open lower end, and a hollow portion extending from the lower open end to the upper closed end. The hollow portion is substantially cylindrical in its upper part, and is tapering outwardly in its lower part towards the open end. A metallic insert is in the shape of a cylindrical tube of a length substantially equal to the length of the hollow portion, and is longitudinally slit over its entire length. It is urged against the walls of the hollow portion by elastic expansion forces inherent to the metal of the tube. The lower portion of the insert is provided with a plurality of slots, starting from the lower edge of the insert to a predetermined length.

In a preferred embodiment of the roller, the insert is slotted by parallel slots to a distance from the lower edge, commensurate with the tapering portion of the outer body, thus forming a slotted skirt normally not in contact with the body material. The outer body is preferably provided with an inwardly projecting, longitudinal ridge, extending along the cylindrical part of the hollow portion, and engaging with the longitudinal slit of the insert, thus preventing rotary motion of the insert inside the body, and guiding the insert into its position during assembly. As an additional safeguard, the insert may be provided with an outwardly extending lug engaging with a recess in the outer body.

*Another embodiment of the hair roller is as follows: A hair curling roller is adapted to be heated by being positioned on a cone-frustum shaped post of a hair roller heating apparatus, consisting of a hollow, cylindrical outer body of a plastic material, provided with external hair gripping means, said body having a closed upper end and an open lower end; and of a metallic insert in the shape of a cylindrical tube of a length substantially equal to the length of the hollow portion of said outer body, said insert being slit longitudinally over its entire length, and being provided with a plurality of slots extending from the lower edge of said tube to a predetermined distance from said lower edge, said slots forming a slotted skirt and whereby said slotted skirt of said inserts expands to the slope of the post and adheres to it on most of its surface.*

DESCRIPTION OF THE PREFERRED EMBODIMENT

Figure 1:
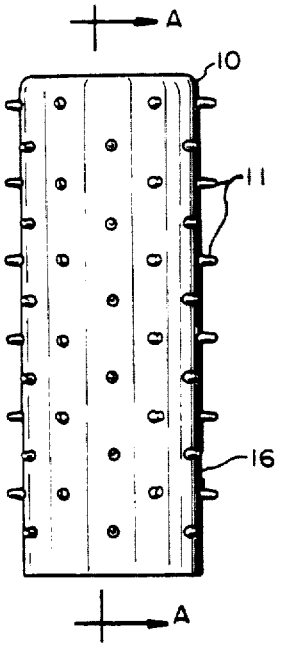
FIG. 1 is an elevation of a hair roller, showing the outside of the outer plastics body.

FIG. 1 illustrates the outside of the outer plastics body of the roller, which consists of a cylindrical shell, 10, being provided with outwardly protruding teeth, 11, arranged in staggered alignment in twelve longitudinal parallel rows. The teeth serve to hold strands of hair, which are wound around the roller, and are heated by its hot surface, and thus remain in curls and waves after the roller has been taken out of the hair.

Figure 2:
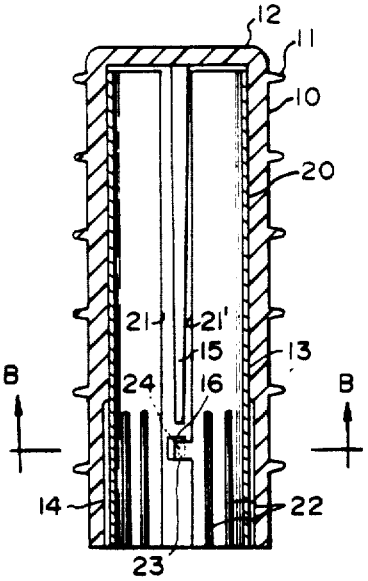
FIG. 2 is a longitudinal section along A—A of FIG. 1, cutting through the outer body and through the metal insert.
Figure 3:
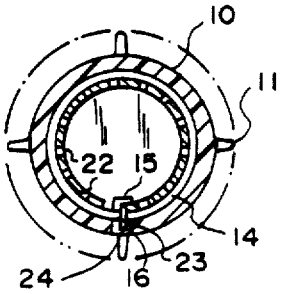
FIG. 3 is a section along B—B of FIG. 2, cutting through the slotted skirt of the insert.

FIGS. 2 and 3 show two sections through the roller of FIG. 1. The outer body is hollow, except for its upper, closed end, 12, the hollow portion having an outer cylindrical portion, 13, of uniform diameter throughout, which extends from the closed end, 12, to about two thirds of the entire length, and an outwardly tapering portion, 14, in the lower third. An inwardly projecting ridge, 15, of uniform cross section, extends along the cylindrical portion, and the body is further provided with a perforation, 16, in the tapered portion.

in line with the ridge, 15, at a small distance from its lower end.

A metal insert is in the shape of a longitudinally slit tube, 20, preferably fabricated by rolling a flat metal sheet to an outer diameter originally slightly larger than the inner cylindrical diameter of the outer body. The insert is of the same length as the hollow portion, and is inserted therein with the sheet edges, 21, 21', positioned to both sides of the ridge, 15. The lower portion of the insert is slotted by a plurality of longitudinal slots, 22, which extend as far as the tapered portion, 14. The sheet edge, 21', is interrupted by a narrow tongue, 23, projecting from the edge, which is bent to form an outwardly protruding lug, 24; this lug engages with the perforation, 16, in the body, and holds the insert in its position in the hollow portion.

Figure 4:
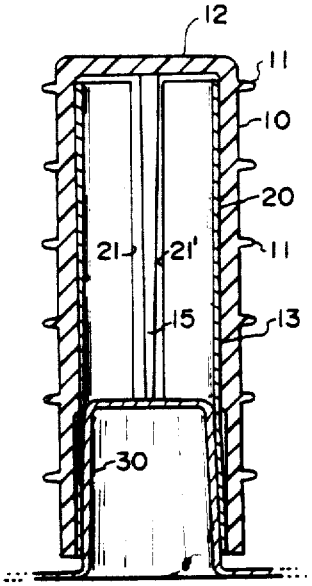
FIG. 4 is a longitudinal section similar to that of FIG. 2, showing the roller positioned on a post of frusto-conical shape.

For inserting the slit tube into the outer body, the tube is compressed to a smaller diameter than that of the body interior and pushed into it until the lug 24, enters the perforation, 16, and the tube is now released. Owing to the initial outer diameter of the insert being larger than the inner diameter of the body, intimate contact is obtained between the cylindrical body portion and the non-slotted insert portion, this contact remaining also during heating of the roller, due to the elasticity of the metal, preferably an aluminum alloy. The roller is positioned on a frusto-conical post, 30, as shown in FIG. 4, by pushing it hard onto it, whereby the slotted skirt of the insert expands to the slope of the post and adheres to it on most of its surface. It is evident that the heat flow through this metal-to-metal contact is practically unimpaired, and that the outer body is brought to the desired temperature much faster than rollers of conventional design. An additional advantage of the slotted skirt is that the roller cannot jam or wedge on the post, owing to the elasticity of the strips between the slots, and that the roller can be readily taken off any post that is suitably designed. It will be understood that the slope of the post is rather small, and that the rollers and the hair setting unit have to be adapted to each other.

What I claim is:

[1. A hair roller adapted to be heated by being positioned on a cone-frustum shaped post of a hair roller heating apparatus, consisting of a hollow, cylindrical outer body, of a plastic material, provided with external hair gripping means, said body having a closed upper end and an open lower end, its hollow portion being cylindrical in its upper part, and tapering outwardly from the lower end of said cylindrical portion towards the lower open end; and of a metallic insert in the shape of a cylindrical tube of a length substantially equal to the length of the hollow portion of said outer body, said insert being slit longitudinally over its entire length, and being provided with a plurality of slots extending from the lower edge of said tube to a predetermined distance from said lower edge.]

[2. The hair roller of claim 1, wherein said cylindrical hollow portion in said outer body extends for about two thirds, and the tapering portion for about one third of the entire length of said hollow portion.]

3. The hair roller of claim [1] *11*, wherein said metallic insert is provided with parallel, longitudinal slots of a length commensurate with the length of said tapering portion of said outer body.

4. The hair roller of claim [1] *10*, wherein said cylindrical portion of said outer body is provided with a longitudinal, inwardly projecting ridge, which engages with the slit of said insert.

5. The hair roller of claim [1] *10*, wherein said insert is provided with an outwardly projecting lug.

6. The hair roller of claim 5, wherein said outer body is provided with a perforation corresponding to said outwardly projecting lug, and wherein said lug engages with said perforation.

7. The hair roller of claim [1] *10*, wherein said insert is made of a resilient aluminum alloy.

8. The hair roller of claim 7, wherein said insert is made of a flat sheet of an aluminum alloy, bent into tubular shape.

9. The hair roller of claim 8 wherein said insert, prior to its insertion into said cylindrical outer body, is in the shape of a longitudinally slit, open cylinder of a diameter initially larger than the inner diameter of said outer body.

*10. A hair curling roller adapted to be heated by being positioned on a cone-frustum shaped post of a hair roller heating apparatus, consisting of a hollow, cylindrical outer body of a plastic material, provided with external hair gripping means, said body having a closed upper end and an open lower end; and of a metallic insert in the shape of a cylindrical tube of a length substantially equal to the length of the hollow portion of said outer body, said insert being slit longitudinally over its entire length, and being provided with a plurality of slots extending from the lower edge of said tube to a predetermined distance from said lower edge, said slots forming a slotted skirt and whereby said slotted skirt of said inserts expands to the slope of the post and adheres to it on most of its surface.*

*11. The hair roller of claim 1 wherein the cylindrical hollow portion of the outer body is cylindrical in its upper part and tapering outwardly in its lower end.*

* * * * *

UNITED STATES PATENT OFFICE

CERTIFICATE OF CORRECTION

Patent No. Re. 32,349 Dated February 10, 1987

Inventor(s) Dov Z. Glucksman

It is certified that error appears in the above-identified patent and that said Letters Patent are hereby corrected as shown below:

On the Title Page:

In the information section

Reissue of:
[64] Patent No.: 5,101,983 should read

Reissue of:
[64] Patent No.: 4,382,447

Signed and Sealed this

Eighth Day of September, 1987

*Attest:*

DONALD J. QUIGG

*Attesting Officer*

*Commissioner of Patents and Trademarks*